Figure 1:
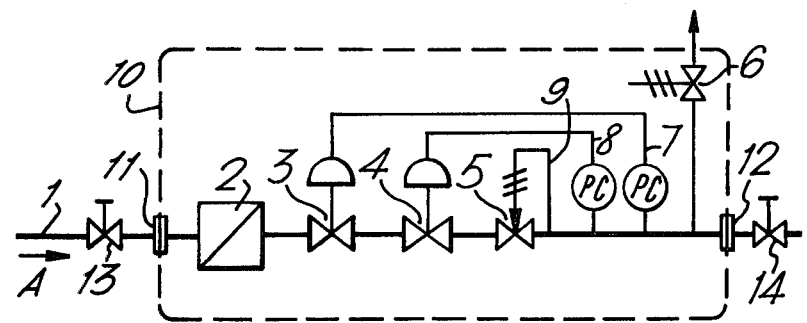

United States Patent [19]

Stoves et al.

[11] 4,311,167
[45] Jan. 19, 1982

[54] REGULATOR INSTALLATION FOR FLUID TRANSMISSION OR DISTRIBUTION SYSTEMS

[75] Inventors: Derek Stoves, St. Johns; Roger W. Hawkins, Benton; Arthur B. Smelt, Allendale, all of England

[73] Assignee: British Gas Corporation, London, England

[21] Appl. No.: 107,919

[22] Filed: Dec. 28, 1979

[51] Int. Cl.³ .............................................. F16K 27/00
[52] U.S. Cl. ................................... 137/454.2; 48/191; 48/192; 137/549; 137/613
[58] Field of Search ............... 48/191, 192; 137/454.2, 137/454.6, 549, 613

[56] References Cited
U.S. PATENT DOCUMENTS 4,207,915  6/1980  Becker et al. ................... 137/549 X Primary Examiner—Gerald A. Michalsky
Attorney, Agent, or Firm—Larson and Taylor

[57] ABSTRACT

A regulator installation, for controlling the pressure and/or flow of gas in a gas transmission or distribution system, comprising a compact module (10) having an inlet (32) and an outlet (33) adapted to be fitted in a pipeline (1) and containing within its outer shell (21,22,23) a removable assembly secured by locking means (29,30) and which carries the essential elements (2 to 9 and 43 to 45) of the regulator installation such that the gas flow path from the inlet (32) passes through the elements (2 to 5) to the outlet (33). The shell is provided with a removable cover (23) for gaining access to the control elements (6 to 9 and 43 to 45) and to the locking means (30) for enabling the assembly (31) to be removed for servicing and replacement.

Figure 2:
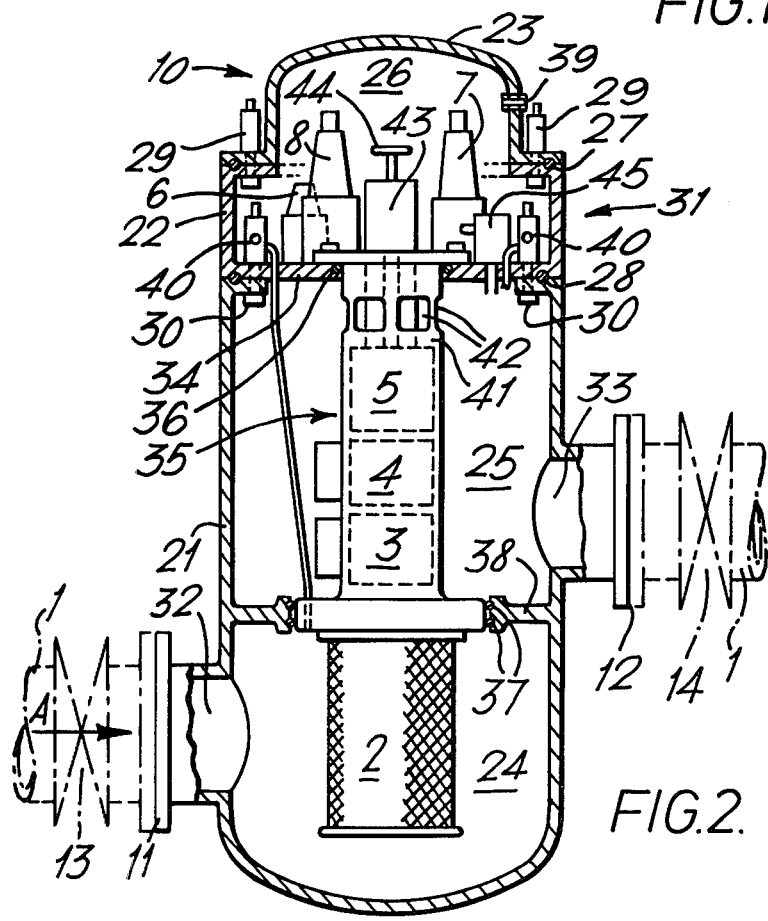

FIG. 2 is suggested as the drawing to accompany the Abstract.

9 Claims, 2 Drawing Figures

REGULATOR INSTALLATION FOR FLUID TRANSMISSION OR DISTRIBUTION SYSTEMS

This invention relates to regulator installations for controlling the pressure and/or flow of a fluid in a fluid transmission or distribution systems, and particularly to such installations for controlling the pressure and/or flow of gas in a pipeline.

Gas Distribution systems are required to operate so as to ensure that the gas flowing in pipelines to the consumer is maintained at a particular pressure so that appliances using the gas as a fuel can work efficiently and safely.

Existing regulator installations consist of a number of essential control elements, for example, filters, regulators, valves, emergency shut-off devices (commonly known as slam-shut valves), and control means, each of which is housed in separate cast or prefabricated bodies and connected by numerous pieces of pipework using a multitude of heavy flanges and an even greater number of bolts and nuts. The result is a system which is space consuming and requires a large expensive building or kiosk to house the installation, and is complex and difficult to maintain on site, and also is likely to leak from some of the many joints. The external impulse auxillary pipework is vulnerable to accidental or wilful damage, and pressure adjusting mechanisms are easily tampered with if vandals enter a kiosk. Once a system is installed, there is no way of "off-site" re-testing after maintenance since the system is a permanent fixture and maintenance would have to be carried out on site, sometimes in severe weather conditions. Furthermore, the aquisition of sites for erecting the kiosks is a particularly severe problem in built-up residential or industrial areas where it can be almost impossible to find locations for them. Alternatively, to divert the gas main to a suitable location for a kiosk is very costly.

The invention as claimed is intended to provide a remedy in that it solves the problems of how to overcome the aforesaid disadvantages with known control installations for gas transmission or distribution systems.

The advantages offered by the invention are mainly that, by reducing the size of the installation, enabling it to be buried, if required, below ground level, the problem of obtaining sites and building expensive kiosks would be eased with a result that the overall cost of the installation will be less, especially since there will be a reduced necessity to re-route the gas main to a suitable location. Also, the particular construction and manner of use of the control systems will virtually eliminate the necessity for on-site maintenance which can be carried out in a workshop, and minimise the time that a gas main is shut down whilst a system is replaced. Furthermore, security against vandalism, accidental damage and unauthorised access to the control elements will be considerably improved, and leakage sources will be minimised by the elimination of many bolted flange connections and diaphragm covers of the various separate elements in an existing installation.

According to the invention, in a regulator installation for controlling the pressure and/or flow of gas in a gas transmission or distribution system, the regulator installation is in the form of a compact module comprising; an outer shell having a removable cover and an inlet and an outlet for connection in a gas pipeline of said system; a regulator assembly removably secured to a part of said outer shell, which assembly includes main elements and control elements of said regulator installation; sealing means between said shell and said assembly for dividing the interior of said shell into a gas-tight high pressure upstream compartment which communicates with said inlet, a gas-tight low pressure downstream compartment which communicates with said outlet, and a compartment substantially at atmospheric pressure.

The arrangement is such that, in use of the module, the gas flow path from said inlet to said upstream compartment passes through said main elements into said downstream compartment to said outlet, and that said control elements are located in said substantially atmospheric pressure compartment whereby access for adjustment to at least some of the control elements can be made after removal of said shell cover, and whereby access to or removal of said regulator assembly can be made either before or after removal of the said shell cover.

One way of carrying out the invention will now be described, by way of example, with reference to the accompanying drawings which illustrate only one specific embodiment of a gas pressure and/or flow control module in accordance with the invention for connection in a gas transmission or distribution pipeline, and in which:

FIG. 1 is a schematic diagram of one typical gas regulator system which can be incorporated in the module, and FIG. 2 is a diagrammatic sectional side view of the module.

Referring first to FIG. 1, the typical regulator system for controlling the downstream pressure and/or flow of gas in a pipeline 1 flowing in the direction of the Arrow A usually includes a filter 2, a monitor regulator 3, an active regulator 4, a slam-shut valve 5, and a pressure relief valve 6, the regulators 3 and 4 being operated by pilot controlled impulse lines 7 and 8 respectively, and the slam-shut valve being operated by an impulse line 9.

In accordance with the invention, the aforesaid elements are incorporated in a module 10, which is connected in the pipeline 1, for example, by means of flanged connections 11 and 12 whilst the gas flow is shut off by isolation valves 13 and 14 fitted at each side of the module.

Referring now to FIG. 2, and in which like elements already described have like reference numerals, the module 10, connected in a pipeline as aforesaid, comprises an outer shell formed by a lower part 21, which is connected in the pipeline 1 by the flanges 11 and 12, a removable intermediate part 22, and a removable top cover 23, defining there between three compartments 24, 25 and 26. Annular sealing rings 27,28 ensure gas and water tight connections between the flanges of the parts 21,22,23 which are locked together by releasable locking means 29 and 30. The lower shell part 21 has a gas inlet 32 communicating with the compartment 24, and a gas outlet 33 communicating with the compartment 25.

The intermediate shell part 22 has an integral annular partition plate 34 and forms part of a removable regulator assembly 31. This assembly includes a cartridge 35 which is fixed to the plate 34 from which it depends and to which it is sealed by a sealing ring 36. The cartridge 35 also engages a seal 37 in an annular partition 38 which projects inwardly from the lower shell 21. Thus, it will be seen that the high pressure upstream compartment 24 is sealed off from the low pressure downstream compartment 25, which in turn is sealed off from the upper compartment 26 which is vented to atmosphere through a vent 39 in the top cover 23.

The cartridge 35 of the removable regulator assembly 31 consists of a casing 41 having gas outlet ports 42 communicating with the compartment 25 and houses the monitor regulator 3, active regulator 4, and slam-shut valve 5. The filter 2 is secured to the bottom of the casing 41 so as to be contained in the upstream compartment 24, which may also include a cyclone dust or particle separator (not shown), possibly instead of the filter 2, in which case the dust particles will fall to the bottom of the lower shell part 21. The cartridge may also include a silencer (not shown).

The removable regulator assembly 31 also includes the two pilot controls 7, 8 for operation of the regulators 3,4, a slam-shut valve actuator 43 with reset (open) means 44, the pressure relief valve 6, and a pressure equalising valve 45 (for enabling the reset means 44 to be operated) together with their connecting lines (not shown); all of which are secured to or carried by the partition plate 34 of the intermediate shell part 22 so as to be removable therewith.

The locking means 30 may also include safety means 40 for venting the gas pressure from the upstream and downstream compartments 24,25 to atmosphere (once the isolation valves 13,14 have been closed) before an unlocking operation can be effected for removal of the whole regulator assembly 31. Of course, access to the controls in the upper compartment 26 can be achieved by unlocking the locking means 29, preferably with a special key, and removing the top cover 23 since the compartment 26 is at atmospheric pressure.

In the use of the module described above, during normal gas flow, gas enters through the inlet 32 into the compartment 24 and is filtered by the filter 2 and then passes through the gas pressure regulators 3 and 4 and on through the slam-shut valve 5 and eventually out through the outlet ports 42 into the compartment 25 to the outlet 33 where it will be at its required pressure or flow rate.

With this arrangement, it will be appreciated that the module may be installed in the pipeline in a small cubicle below ground level with access to it from a manhole cover. Thus, if a fault develops in the installation, it can be speedily rectified by removing the whole regulator assembly 31 from the lower shell part 21 and replacing it with a servicable assembly with the minimum loss of gas supplies. By having another module in a parallel branch line to which the pipeline can be switched, little or no loss of supplies will occur. The faulty assembly can then be taken away from the site and serviced in a workshop.

Whilst the module described is intended to be operated by well known pneumatic control means, it will be understood that other means, such as electrically-operated actuators controlled by electronic means, could be used without departing from the scope of the invention.

Furthermore, whilst this embodiment describes a particularly advantageous arrangement in which the various components of the regulator system 2,3,4 and 5 are axially aligned so to obtain optimum dynamic axial flow of the gas through the various system components, other axially or non-axially aligned arrangements of the system's components (which in themselves may be varied) but in a different sequential order to that shown may be arranged. Also, the or each filter may be separately supported as another assembly within the shell or within a separately connected shell, in either case, having a removable access cover for easy replacement of the filter element alone without having to remove the assembly carrying the other components.

In another arrangement, the outer shell could house three or more assemblies in any combination of filter assemblies and pressure/flow regulator assemblies interconnected in any convenient manner. Where, for example, such an arrangement included two pressure/flow regulator assemblies and one filter assembly, each regulator assembly can be designed to deal with the same or a different range of pipeline gas pressure, and arranged to be switchable from one assembly to another, but utilising the common filter assembly.

We claim:

1. A regulator installation for controlling at least one parameter selected from the group consisting of pressure and flow of gas in a gas transmission or distribution system, wherein the regulator installation is in the form of a compact module comprising; an outer shell having a removable cover and an inlet and an outlet for connection in a gas pipeline of said system; a regulator assembly removeably secured to a part of said outer shell, which assembly includes main elements and control elements of said regulator installation; sealing means between said shell and said assembly for dividing the interior of said shell into a gas-tight high pressure upstream compartment which communicates with said inlet, a gas-tight low pressure downstream compartment which communicates with said outlet, and a compartment substantially at atmospheric pressure.

2. A regulator installation according to claim 1, wherein said regulator assembly includes a support member which carries said elements.

3. A regulator installation according to claim 2, wherein said support member forms a part of said outer shell.

4. A regulator installation according to claim 3, wherein said support member is interposed between a main body part and said cover of said shell.

5. A regulator installation according to any preceding claim, wherein means are provided for locking and unlocking said regulator assembly and said cover to or from associated parts of said shell.

6. A regulator installation according to any one of claims 1-4, wherein means are provided for relieving gas pressures in said upstream and downstream compartments for enabling the regulator assembly to be removed safely from the shell.

7. A regulator installation according to claim 6, wherein means are provided for locking and unlocking said regulator assembly and said cover to or from associated parts of said shell, and wherein said locking and unlocking means are associated with said pressure relieving means in a way that will ensure that the said pressure-relieving means is operated to relieve pressures as aforesaid, before unlocking said regulator assembly.

8. A regulator installation according to any one of claims 1-4, wherein said main elements of the regulator assembly include a filter, one or more pressure-regulating governors, and a slam-shut valve, each located in axially aligned relationship with each other.

9. A regulator installation according to any one of claims 1-4 for incorporating in a gas pipeline whose upstream and downstream terminal ends are provided with isolating valves, wherein said inlet and outlet of the module are provided with a coupling member for connection to a respective terminal end of the pipeline.

* * * * *